| (12) | United States Patent | (10) Patent No.: | US 9,971,946 B2 |
|---|---|---|---|
| | Ito | (45) Date of Patent: | May 15, 2018 |

(54) TRAVELING ROAD SURFACE DETECTION DEVICE AND TRAVELING ROAD SURFACE DETECTION METHOD

(71) Applicant: TOYOTA JIDOSHA KABUSHIKI KAISHA, Toyota-shi, Aichi-ken (JP)

(72) Inventor: Hiroaki Ito, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 291 days.

(21) Appl. No.: 15/018,331

(22) Filed: Feb. 8, 2016

(65) Prior Publication Data

US 2016/0232413 A1 Aug. 11, 2016

(30) Foreign Application Priority Data

Feb. 9, 2015 (JP) ................................ 2015-023466

(51) Int. Cl.
G06K 9/00 (2006.01)
G06T 3/40 (2006.01)
G06T 7/514 (2017.01)

(52) U.S. Cl.
CPC ..... *G06K 9/00798* (2013.01); *G06K 9/00791* (2013.01); *G06K 9/00805* (2013.01); *G06T 3/4007* (2013.01); *G06T 7/514* (2017.01); *G06T 2207/10028* (2013.01); *G06T 2207/20212* (2013.01); *G06T 2207/30256* (2013.01)

(58) Field of Classification Search
CPC .......... G06K 9/00798; G06K 9/00805; G06K 9/00791; G06T 7/514; G06T 3/4007; G06T 2207/20212; G06T 2207/30256; G06T 2207/10028

USPC .......................................................... 382/103
See application file for complete search history.

(56) References Cited

U.S. PATENT DOCUMENTS

| 2014/0071240 A1 | 3/2014 | Chen et al. | |
|---|---|---|---|
| 2015/0324649 A1* | 11/2015 | Grewe | G06K 9/00791 382/104 |

FOREIGN PATENT DOCUMENTS

WO 2014/090245 A1 6/2014

OTHER PUBLICATIONS

Lombardi, P., et al., "Unified stereovision for ground, road, and obstacle detection", Intelligent Vehicles Symposium, 2005 Proceedings. IEEE, Jun. 6, 2005, pp. 783-788, XP010833892.

(Continued)

*Primary Examiner* — Amandeep Saini
(74) *Attorney, Agent, or Firm* — Sughrue Mion, PLLC

(57) ABSTRACT

A traveling road surface detection device includes: a traveling road surface determination unit that determines whether each of image areas into which a captured image is divided is on a traveling road surface based on disparity information; and a traveling road surface interpolation unit that interpolates a first image area into a detected traveling road surface based on brightness information, the first image area among image areas determined as not the traveling road surface, wherein each of the image areas is configured by a plurality of pixel ranges, and the first image area is an image area that a number of first pixel ranges adjacent to a pixel range with brightness difference that is less than or equal to a first threshold, is equal to or larger than a second threshold, or that a ratio of the first pixel ranges is equal to or larger than a third threshold.

12 Claims, 10 Drawing Sheets

(56) References Cited

OTHER PUBLICATIONS

Xin, L., et al., "A real-time vehicle detection and tracking system in outdoor traffic scenes", Pattern Recognition, Proceedings of the 17$^{th}$ International Conference on Pattern Recognition (ICPR'04), vol. 2, Aug. 23, 2004, pp. 761-764, XP010724503.

Zhang, J., et al., "Texture-Based Segmentation of Road Images", Oct. 24, 1994, pp. 260-265, XP010258343.

\* cited by examiner

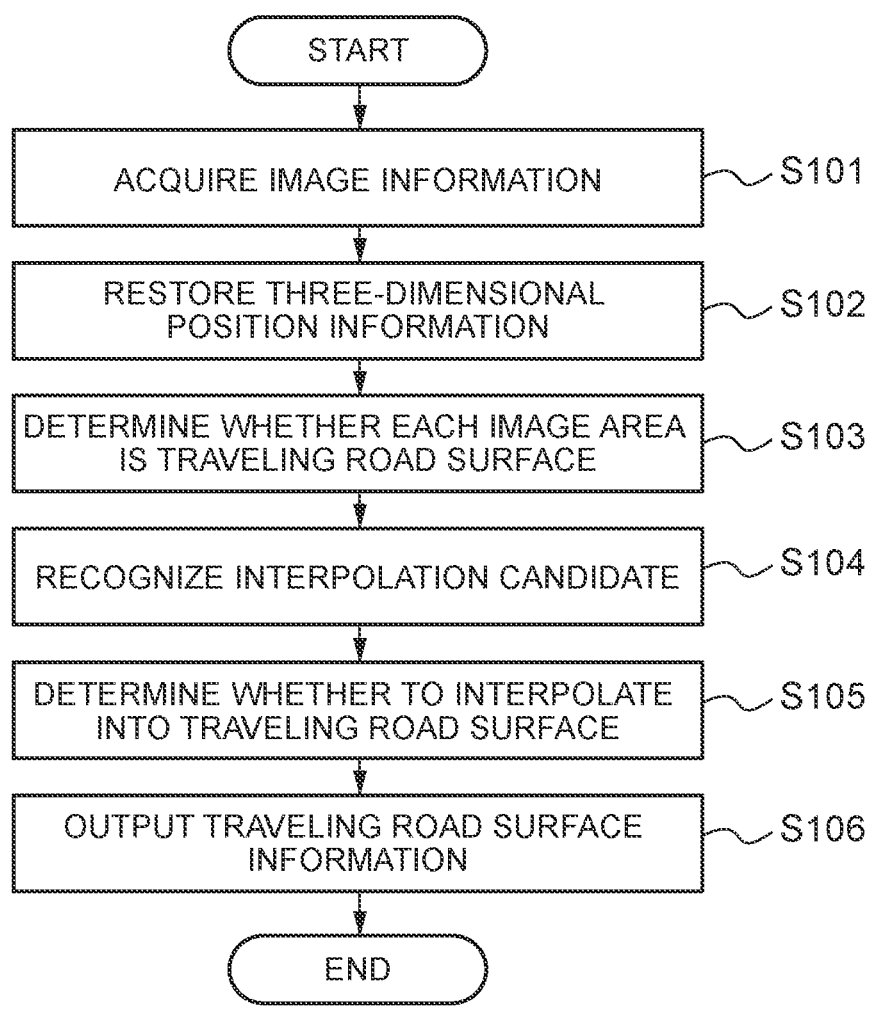

TRAVELING ROAD SURFACE DETECTION DEVICE AND TRAVELING ROAD SURFACE DETECTION METHOD

CROSS REFERENCE TO RELATED APPLICATION

This application claims priority from Japanese Patent Application No. 2015-023466 filed on Feb. 9, 2015, the disclosure of which including the specification, drawings and abstract is incorporated herein by reference in its entirety.

BACKGROUND

1. Field

Apparatuses, systems and methods consistent with exemplary embodiments relate to a traveling road surface detection device and a traveling road surface detection method for detecting a traveling road surface from a captured image.

2. Related Art

U.S. Patent Application Publication No. 2014/0071240 describes a device for detecting the traveling road surface, on which a vehicle travels, using the disparity information from images from around the vehicle captured by a stereo camera. In addition, the aforementioned publication describes a device for detecting the traveling road surface using the disparity information (distance information) from a captured image.

However, the accuracy in extracting the disparity information (restoration of three-dimensional positions) from a captured image tends to decrease in an area, such as a traveling road surface (for example, an asphalt-paved road surface), where the brightness difference between each area is small. This causes a problem that the traveling road surface cannot be detected in a necessary and sufficient range. Therefore, in this technical field, there is a strong need for a traveling road surface detection device and a traveling road surface detection method that can increase the detection range of a traveling road surface.

SUMMARY

According to an aspect of an exemplary embodiment, there is provided a traveling road surface detection device that detects a traveling road surface based on disparity information obtained from a captured image around a vehicle captured by an in-vehicle camera. The traveling road surface detection device includes: a traveling road surface determination unit configured to determine whether each of a plurality of image areas into which a captured image is divided is on a traveling road surface based on disparity information obtained from the captured image; and a traveling road surface interpolation unit configured to interpolate a first image area into a detected traveling road surface based on brightness information of the captured image, the first image area being included in interpolation candidates among image areas determined as not being a part of the traveling road surface by the traveling road surface determination unit. Each of the plurality of image areas is comprises a plurality of pixel ranges. The first image area is at least one from among: an image area in which a number of first pixel ranges adjacent to a pixel range with a brightness difference that is less than or equal to a first threshold, is equal to or larger than a second threshold, and an image area in which a ratio of the first pixel ranges is equal to or larger than a third threshold.

According to this traveling road surface detection device, the disparity information can be obtained accurately for an image area in which the brightness change is large in the captured image and, in this case, the traveling road surface can be determined based on the disparity information. On the other hand, for an image area in which the brightness change is small in the captured image, the image area may be determined as an interpolation candidate for the traveling road surface based on the brightness information. Therefore, this traveling road surface detection device can increase the detection range of the traveling road surface as compared to a road surface detection device in which the traveling road surface is detected only based on the disparity information.

The traveling road surface interpolation unit may use a second image area that is among the image areas determined as not the traveling road surface by the traveling road surface determination unit and is within a distance equal to or smaller than a fourth threshold from the in-vehicle camera, as the interpolation candidate.

The accuracy of the disparity information becomes lower as an image area is more distant from the in-vehicle camera. In the above specification, the traveling road surface detection device determines an image area, the distance of which from the in-vehicle camera is equal to or smaller than the fourth threshold, as an interpolation candidate. This avoids incorrect traveling road surface interpolation that might occur when the interpolation candidate is an indefinitely distant image area.

The traveling road surface detection device may include a lane boundary detection unit that detects lane boundaries of a traveling lane in which the vehicle travels, based on the captured image, and the traveling road surface interpolation unit may use a third image area that is among the image areas determined as not the traveling road surface by the traveling road surface determination unit and is nearer to the traveling lane than the lane boundaries, as the interpolation candidate.

In some cases, there is no need for detecting the traveling road surface outside the traveling lane in which the vehicle travels. In the above specification, the traveling road surface detection device may determine an image area that is on the side nearer to the traveling lane than the lane boundaries such as a white line as an interpolation candidate. This prevents a part, such as a level difference on the road shoulder outside the traveling lane, from being interpolated incorrectly as the traveling road surface.

The traveling road surface interpolation unit may use a fourth image area that is among the image areas determined as not the traveling road surface by the traveling road surface determination unit and is adjacent to either an image area determined as the traveling road surface by the traveling road surface determination unit or the first image area, as the interpolation candidate.

Because the traveling road surface is continuous, this traveling road surface detection device determines an image area, which adjoins an image area determined as the traveling road surface or an image area interpolated as the traveling road surface, as an interpolation candidate. This prevents an object (such as a wall face), separate from the traveling road surface, from being incorrectly interpolated as the traveling road surface.

According to an aspect of an exemplary embodiment, there is provided a traveling road surface detection method for use by a traveling road surface detection device that detects a traveling road surface based on disparity information obtained from a captured image around a vehicle captured by an in-vehicle camera. The traveling road surface detection method includes: a traveling road surface determination step in which a traveling road surface determination unit of the traveling road surface detection device determines whether each of a plurality of image areas into which a captured image is divided is on a traveling road surface based on disparity information obtained from the captured image; and a traveling road surface interpolation step in which a traveling road surface interpolation unit of the traveling road surface detection device interpolates a first image area into a detected traveling road surface based on brightness information of the captured image, the first image area being included in interpolation candidates among image areas determined as not being a part of the traveling road surface by the traveling road surface determination unit. Each of the plurality of image areas comprises a plurality of pixel ranges. The first image area is at least one from among: an image area in which a number of first pixel ranges adjacent to a pixel range with a brightness difference that is less than or equal to a first threshold, is equal to or larger than a second threshold, and an image area in which a ratio of the first pixel ranges is equal to or larger than a third threshold.

According to this aspect of a traveling road surface detection method, the disparity information can be obtained accurately for an image area in which the brightness change is large in the image and, in this case, the traveling road surface can be determined based on the disparity information. On the other hand, for an image area in which the brightness change is small, the image area may be determined as an interpolation candidate for the traveling road surface based on the brightness information. Therefore, this traveling road surface detection method can increase the detection range of the traveling road surface as compared to a method in which the traveling road surface is detected only based on the disparity information.

As described above, according to the various aspects of exemplary embodiments, the detection range of the traveling road surface can be increased.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9 is a flowchart showing a traveling road surface detection method used by the traveling road surface detection device according to an exemplary embodiment.

DETAILED DESCRIPTION OF EXEMPLARY EMBODIMENTS

Exemplary embodiments are described below with reference to the drawings.

Figure 1:
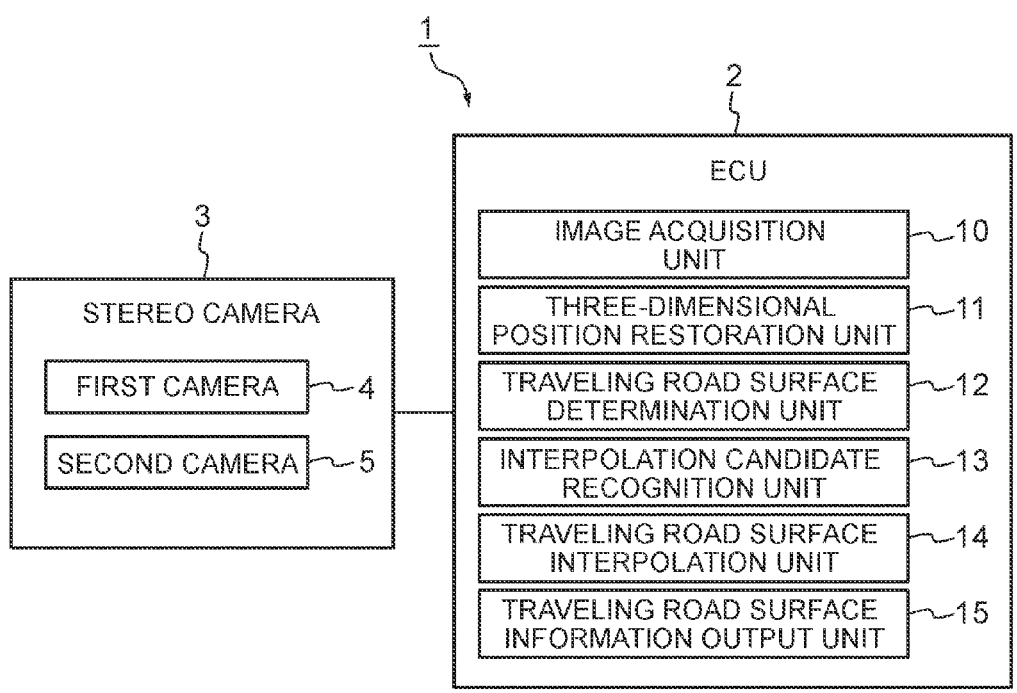
FIG. 1 is a block diagram showing a traveling road surface detection device in an exemplary embodiment.

A traveling road surface detection device 1 according to an exemplary embodiment shown in FIG. 1, usually mounted on a vehicle such as a car, detects the traveling road surface based on the disparity information (distance information received from an in-vehicle camera) obtained from a captured image created by capturing the surroundings of the vehicle. The traveling road surface refers to a road surface on which the vehicle can travel. The traveling road surface may include not only the road surface of a road on which the vehicle travels but also the road surface of the entrance to or exit from a parking lot and the road surface of a parking space.

The traveling road surface detection device 1 acquires a captured image using an in-vehicle camera that captures the surroundings of the vehicle and, based on disparity information on a disparity image generated from the captured image, detects the traveling road surface. The disparity image refers to an image that includes disparity information. For example, each pixel configuring the disparity image includes disparity information.

The configuration of the traveling road surface detection device is described below. As shown in FIG. 1, the traveling road surface detection device 1 includes an Electronic Control Unit (ECU) 2 (e.g., electronic controller, etc.), which detects the traveling road surface, and a stereo camera (in-vehicle camera) 3. The ECU 2 is an electronic control unit that includes a Central Processing Unit (CPU), a Read-Only Memory (ROM), and a Random Access Memory (RAM). In the ECU 2, the program stored in the ROM is loaded into the RAM for execution by the CPU to perform various types of processing. The ECU 2 may also be configured as two or more electronic control units. In addition, the ECU 2 may be implemented using circuitry, a microprocessor, etc.

The stereo camera 3 is an image acquisition apparatus that captures the surroundings of the vehicle to acquire the captured image. The stereo camera 3 includes a first camera 4 and a second camera 5 arranged so that the disparity between the right eye and the left eye can be emulated. The first camera 4 and the second camera 5, provided, for example, on the interior side of the windshield of the vehicle, capture the image of the area ahead of the vehicle. The first camera 4 and the second camera 5 may also be provided on the lateral of the vehicle or on the rear of the vehicle (for example, on the interior side of the rear glass) to capture the image to the side or in back of the vehicle. The stereo camera 3 sends the captured image to the ECU 2.

The traveling road surface detection device 1 may include a monocular camera in place of the stereo camera 3. A monocular camera can also produce a disparity image from a captured image using a method (for example, a method that uses a difference between image-capturing times).

Next, the functional and structural configuration of the ECU 2 is described. As shown in FIG. 1, the ECU 2 includes an image acquisition unit 10, a three-dimensional position restoration unit 11, a traveling road surface determination unit 12, an interpolation candidate recognition unit 13, a traveling road surface interpolation unit 14, and a traveling road surface information output unit 15. The units may be implemented by microprocessor configured to read and execute computer executable instructions or by circuitry configured to implement functions of the aforementioned units.

Figure 2:
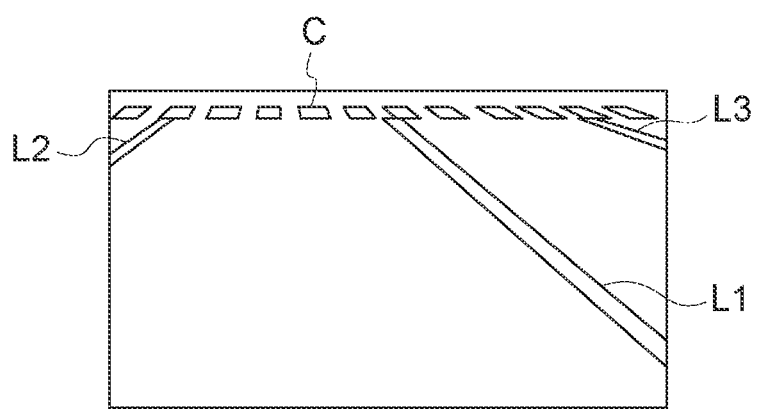
FIG. 2 is a diagram showing a captured image captured by a stereo camera.

The image acquisition unit 10 acquires a captured image captured by the stereo camera 3. FIG. 2 is a diagram showing a captured image captured by the stereo camera 3. FIG. 2 shows a captured image generated by capturing the area ahead of the vehicle. FIG. 2 shows white lines (lane boundary lines), L1 and L2, that define the traveling lane of the vehicle, a white line L3 that, together with the white line L1, defines the adjoining lane, and a pedestrian crossing C. The image acquisition unit 10 generates a disparity image, which includes disparity information, using a method, based on the captured images received from the first camera 4 and the second camera 5 of the stereo camera 3.

The image acquisition unit 10 may also detect the lane boundaries of the traveling lane, in which the vehicle travels, based on the acquired captured image. For example, the image acquisition unit 10 may recognize the white lines (recognition of white lines L1 and L2) by performing image processing (for example, edge detection processing) for the captured image. In this case, the image acquisition unit 10 functions as a lane boundary detection unit.

The three-dimensional position restoration unit 11 restores three-dimensional position information (three-dimensional position coordinates), corresponding to the pixels of the captured image, based on the disparity information. The three-dimensional position restoration unit 11 restores three-dimensional position information, corresponding to the pixels of the captured image.

Figure 3A:
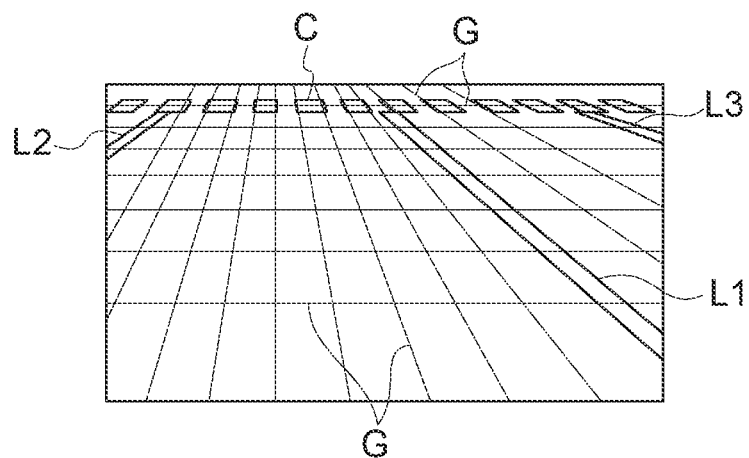
FIG. 3A is a diagram showing a captured image divided into a plurality of image areas.

The three-dimensional position restoration unit 11 divides the captured image into a plurality of image areas using the grid G. An image area refers to an area created by dividing the captured image. FIG. 3A is a diagram showing a captured image divided into a plurality of image areas. The horizontal lines of the grid G are a plurality of lines parallel with the horizontal direction (vehicle width direction) of the captured image. The vertical lines of the grid G are a plurality of lines that converge into the vanishing point in the captured image. As shown in FIG. 3A, the three-dimensional position restoration unit 11 divides the captured image into a plurality of image areas in a trapezoidal form in such a way that the horizontal width of an image area becomes smaller as it goes from the bottom side (that is, the side near to the vehicle) to the top side. The grid G and the image areas shown in FIG. 3A are exemplary only. The grid G and the method for dividing the captured image into a plurality of image areas are not limited to those described above but any method may be used.

The traveling road surface determination unit 12 determines whether each image area is the traveling road surface, using the three-dimensional position information restored based on the disparity information. For example, the traveling road surface determination unit 12 divides the captured image into rectangular areas and, in each area, determines whether the area is the traveling road surface by grouping the pixels the disparity change (distance change, height change) of which is continuous from the bottom edge of the captured image to the top side. A rectangular area may be an area composed of a plurality of image areas connected in the vertical direction of the captured image. In addition, in each rectangular area, the traveling road surface determination unit 12 may determine whether the area is the traveling road surface by extracting the disparity information of the road surface, which is continuous from the bottom edge of the captured image toward the top side, from the disparity distribution characteristics (disparity change) in the so-called captured-image vertical coordinate system and by applying the extracted disparity information of the road surface to the data in the traveling road surface distance-height coordinate system that is stored in advance. The traveling road surface determination unit 12 may also determine whether each image area is the traveling road surface, based on the disparity information included in the captured image.

Figure 3B:
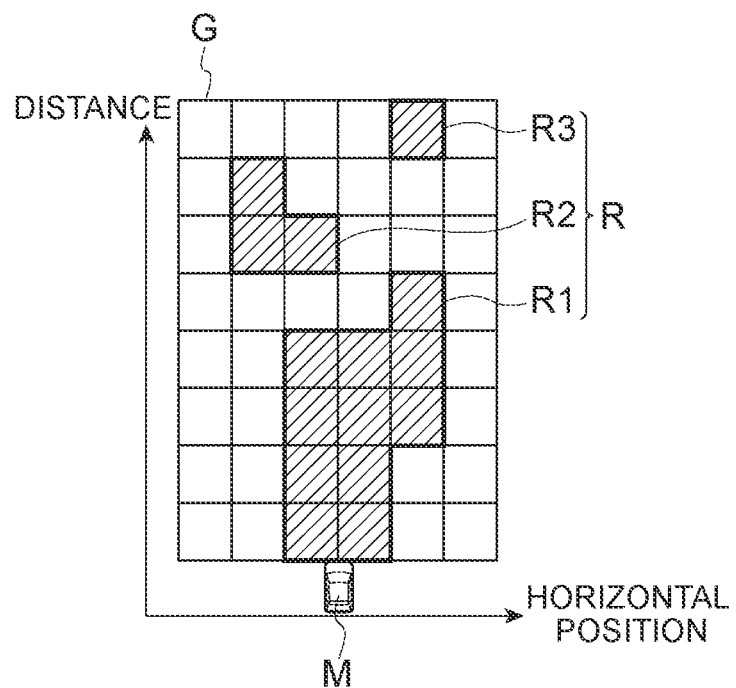
FIG. 3B is a grid map corresponding to a plurality of image areas.

FIG. 3B is a grid map corresponding to a plurality of image areas. The grid map shown in FIG. 3B is a map that shows the image areas with the vertical axis denoting the distance (distance in the vehicle traveling direction) and the horizontal axis denoting the horizontal position (position in the vehicle width direction). A vehicle M is shown at the bottom of the grid map. The traveling road surface determination unit 12 generates the grid map from the captured image for use in determining whether an image area is the traveling road surface in the grid map. For example, the traveling road surface determination unit 12 generates the grid map in which each image area is represented as a square. The traveling road surface determination unit 12 need not necessarily use the grid map nor have to generate the grid map in determining whether an image area is the traveling road surface.

FIG. 3B shows road-surface-determined areas R each of which is determined by the traveling road surface determination unit 12 as the traveling road surface. More specifically, FIG. 3B shows three road-surface-determined areas R: first road-surface-determined area R1 nearest to the vehicle M, second road-surface-determined area R2 positioned more distant (from the vehicle M) than the first road-surface-determined area R1, and third road-surface-determined areas R3 positioned most distant from the vehicle M. As shown in FIG. 3B, because the accuracy of the disparity information that the traveling road surface determination uses may not be sufficient, it is difficult to detect road-surface-determined areas in a necessary and sufficient manner, sometimes resulting in a situation in which discontinuous areas (scattered areas) are determined as traveling road surfaces.

The interpolation candidate recognition unit 13 recognizes interpolation candidates for the traveling road surface. For example, the interpolation candidate recognition unit 13 recognizes all image areas, which are image areas of the captured image and are not determined by the traveling road surface determination unit 12 as the traveling road surface, as interpolation candidates. The interpolation candidate recognition unit 13 may also recognize only a part of image areas, which are not determined by the traveling road surface determination unit 12 as the traveling road surface, as interpolation candidates. Modifications of an interpolation candidate will be described later in detail.

The traveling road surface interpolation unit 14 determines whether an interpolation candidate, recognized by the interpolation candidate recognition unit 13, is to be interpolated as the traveling road surface based on the brightness information on the captured image. The brightness information is, for example, information on the brightness of each pixel of the captured image.

Figure 4A:
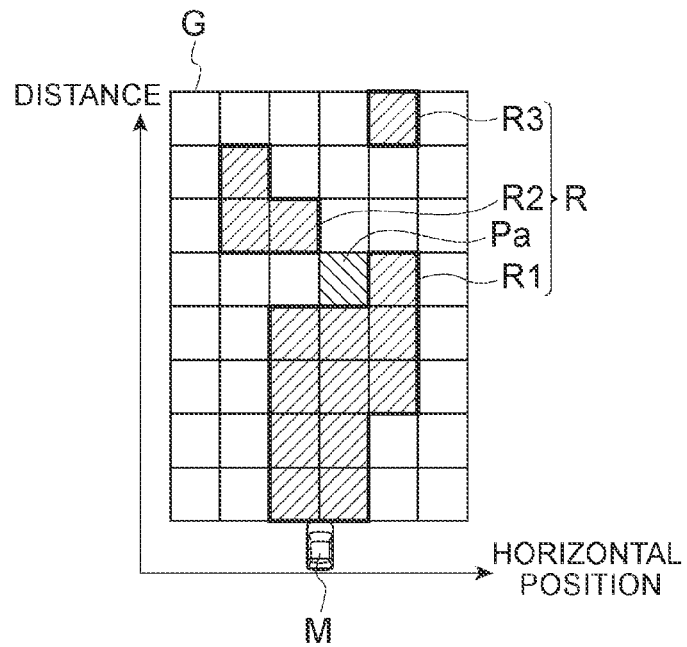
FIG. 4A is a diagram showing an interpolation candidate for a traveling road surface in the grid map.

FIG. 4A is a diagram showing an interpolation candidate Pa for the traveling road surface in the grid map. The interpolation candidate Pa is an image area not determined by the traveling road surface determination unit 12 as the traveling road surface and is an image area recognized by the interpolation candidate recognition unit 13 as an interpolation candidate. The following describes traveling road surface interpolation using one interpolation candidate Pa.

Figure 4B:
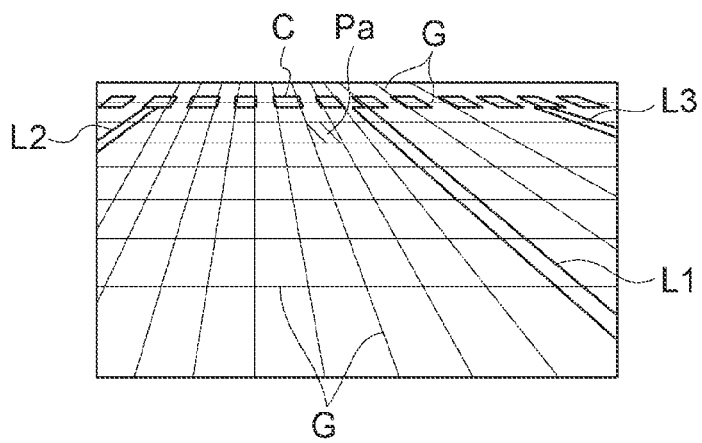
FIG. 4B is a diagram showing an interpolation candidate for the traveling road surface in a captured image.
Figure 4C:
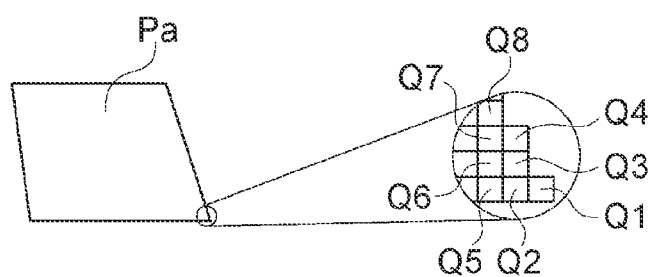
FIG. 4C is a diagram showing a plurality of pixel ranges configuring the image area of an interpolation candidate.

FIG. 4B is a diagram showing the interpolation candidate Pa for a traveling road surface in the captured image. The interpolation candidate Pa shown in FIG. 4B corresponds to the interpolation candidate Pa shown in FIG. 4A. FIG. 4C is a diagram showing a plurality of pixel ranges Q1-Q8 that configure the interpolation candidate Pa. A pixel range refers to a range composed of one pixel, or a range composed of a plurality of pixels, in the captured image. A pixel range is a range smaller than an image area, and an image area is configured by one or more pixel ranges. A pixel range is a range that includes the same number of pixels, and has the same shape, in all image areas. The number of pixel ranges included in an image area becomes smaller as the image area is more distant from the stereo camera 3.

The traveling road surface interpolation unit 14 determines whether the interpolation candidate Pa is a low-texture area. A low-texture area refers to an image area in which the number of pixel ranges, which adjoin each other and the brightness difference between which is equal to or smaller than a first threshold is equal to or larger than a second threshold or to an image area in which the ratio of pixel ranges, which adjoin each other and the brightness difference between which is equal to or smaller than the first threshold, is equal to or larger than a third threshold. Adjoining pixel ranges refer to pixel ranges that adjoin each other. For example, pixel range Q1 and pixel range Q2, shown in FIG. 4C, adjoin each other. Pixel range Q2 and pixel range Q3 adjoin each other. Pixel range Q3 adjoins pixel ranges Q2, Q4, and Q6 each other. Pixel range Q3 may adjoin diagonally located pixel ranges Q1, Q7, and Q5 or may not adjoin Q1, Q7, and Q5.

A brightness difference refers to the difference in brightness between adjoining pixel ranges. For a pixel range composed of one pixel, the brightness of the pixel range is the brightness of the pixel. For a pixel range composed of two or more pixels, the brightness of the pixel range may be the average brightness value of the pixels or the maximum brightness value of the pixels. The first threshold is a threshold to compare with the brightness difference between adjoining pixel ranges. The first threshold may be a fixed value or may be a value that varies according to whether it is daytime or nighttime or according to the weather conditions. For example, the traveling road surface interpolation unit 14 compares the brightness between adjoining pixel ranges only in the image area of an interpolation candidate. Instead of this, the traveling road surface interpolation unit 14 may compare the brightness between adjoining pixel ranges across the boundary of image areas. That is, the traveling road surface interpolation unit 14 may compare the brightness between a pixel range in one image area, which is an interpolation candidate, and a pixel range in one of the other adjoining image areas for determining whether the interpolation candidate is a low-texture area.

The second threshold and the third threshold are thresholds for determining whether to interpolate an interpolation candidate as the traveling road surface. The second threshold and the third threshold may be a fixed value or may be a value that varies according to whether it is daytime or nighttime or according to the weather conditions.

Figure 5A:
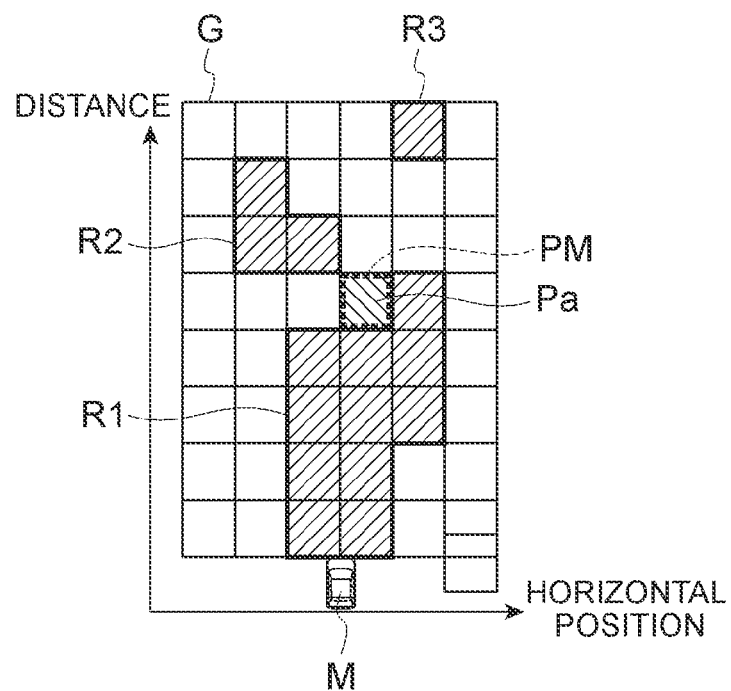
FIG. 5A is a diagram showing an interpolated traveling road surface in a grid map.

When it is determined that the interpolation candidate Pa is an image area in which the number of pixel ranges, which adjoin each other and the brightness difference between which is equal to or smaller than the first threshold, is equal to or larger than the second threshold or is an image area in which the ratio of pixel ranges, which adjoin each other and the brightness difference between which is equal to or smaller than the first threshold (that is, the ratio of those pixel ranges to all pixel ranges of the interpolation candidate Pa), is equal to or larger than the third threshold, the traveling road surface interpolation unit 14 determines that the interpolation candidate Pa is a low texture area. When it is determined that the interpolation candidate Pa is a low-texture area, the traveling road surface interpolation unit 14 interpolates the interpolation candidate Pa as the traveling road surface. Conversely, when it is determined that the interpolation candidate Pa is not a low-texture area, the traveling road surface interpolation unit 14 does not interpolate the interpolation candidate Pa as the traveling road surface. FIG. 5A is a diagram showing an interpolation area PM in the grid map. The interpolation area PM shown in FIG. 5A is an area interpolated by the traveling road surface interpolation unit 14 as the traveling road surface.

Figure 5B:
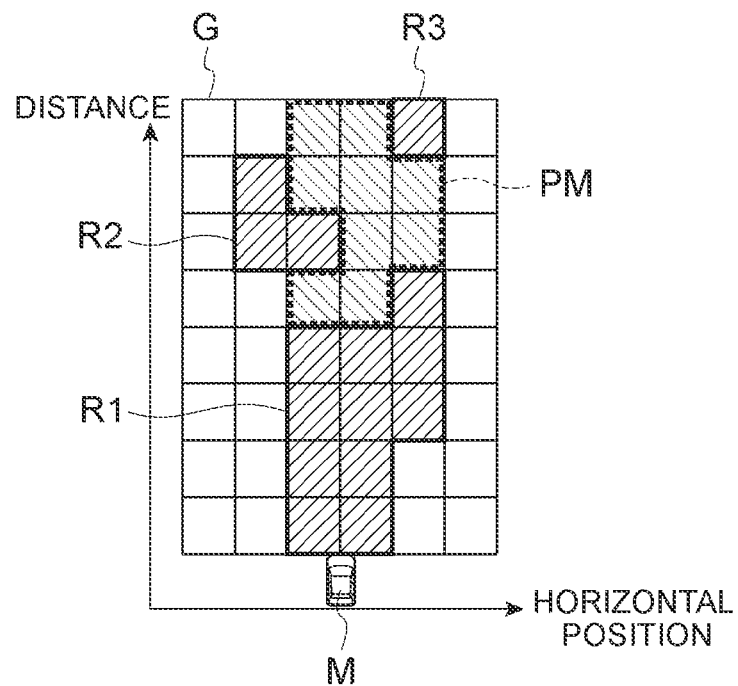
FIG. 5B is a grid map showing an example of the state in which the interpolation of the traveling road surface is completed.

The traveling road surface interpolation unit 14 repeatedly determines whether each image area, recognized as an interpolation candidate, is to be interpolated as the traveling road surface, thus performing traveling road surface interpolation in the grid map. FIG. 5B is a grid map showing an example of the state in which the interpolation of the traveling road surface is completed. As shown in FIG. 5B, the traveling road surface interpolation unit 14 performs traveling road surface interpolation such that the space among the first road-surface-determined area R1, second road-surface-determined area R2, and third road-surface-determined area R3 is filled up. The road-surface-determined areas R (first road-surface-determined area R1, second road-surface-determined area R2, and third road-surface-determined area R3) and the interpolation area PM, all of which are shown in FIG. 5B, are detected as the traveling road surface in the captured image.

On the other hand, when it is determined that the number of pixel ranges, which adjoin each other and the brightness difference between which is equal to or smaller than the first threshold, is smaller than the second threshold, the traveling road surface interpolation unit 14 does not interpolate the interpolation candidate Pa as the traveling road surface. When all image areas that are not determined by the traveling road surface determination unit 12 as the traveling road surface are used as interpolation candidates, the image areas in FIG. 5B, other than the road-surface-determined areas R and interpolation area PM, are each an image area in which the number of pixel ranges, which adjoin each other and the brightness difference between which is equal to or smaller than the first threshold, is smaller than the second threshold. The traveling road surface interpolation unit 14 need not necessarily use the grid map and may perform traveling road surface interpolation in the captured image.

The traveling road surface information output unit 15 outputs information on the road-surface-determined areas R and the interpolation area PM to the outside devices as a detected traveling road surface. For example, the traveling road surface information output unit 15 outputs the detected traveling road surface information to the ECU that performs the autonomous driving of the vehicle M or to the ECU that performs the driving support of the vehicle M.

Figure 6A:
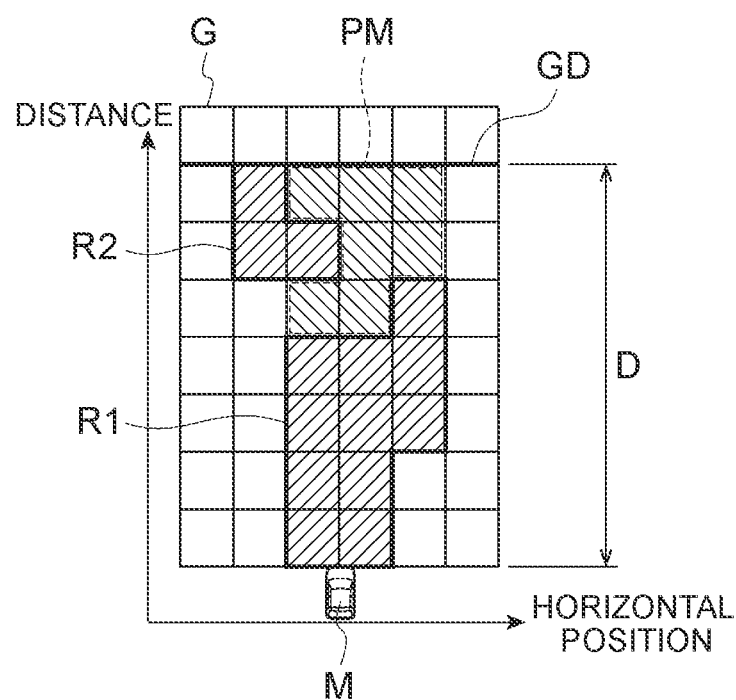
FIG. 6A is a grip map showing a limit on the interpolation candidates imposed by the distance from the stereo camera.

Next, variations of an interpolation candidate are described below. FIG. 6A is a grid map showing a limit on the interpolation candidates imposed by the distance from the stereo camera 3. FIG. 6A shows a fourth threshold D and a horizontal line GD of the grid G corresponding to the fourth threshold D. As shown in FIG. 6A, the interpolation candidate recognition unit 13 recognizes an image area as an interpolation candidate when the image area is not determined by the traveling road surface determination unit 12 as the traveling road surface and the distance from the stereo camera 3 (vehicle M) is equal to or smaller than the fourth threshold D. That is, the interpolation candidate recognition unit 13 does not recognize the image areas, the distance of which from the stereo camera 3 exceeds the fourth threshold D, as an interpolation candidate. This avoids incorrect traveling road surface interpolation in a distant image area where the accuracy in the brightness information is low. The fourth threshold D is a threshold for limiting the interpolation candidates. The fourth threshold D may be a fixed value or a variable value. For example, the fourth threshold D is a distance with which the determination accuracy of the traveling road surface can be ensured according to the performance of the stereo camera 3 (distance with which the accuracy in the disparity information can be ensured). The fourth threshold D may also be set according to external control contents that use the detection result of the traveling road surface.

Figure 6B:
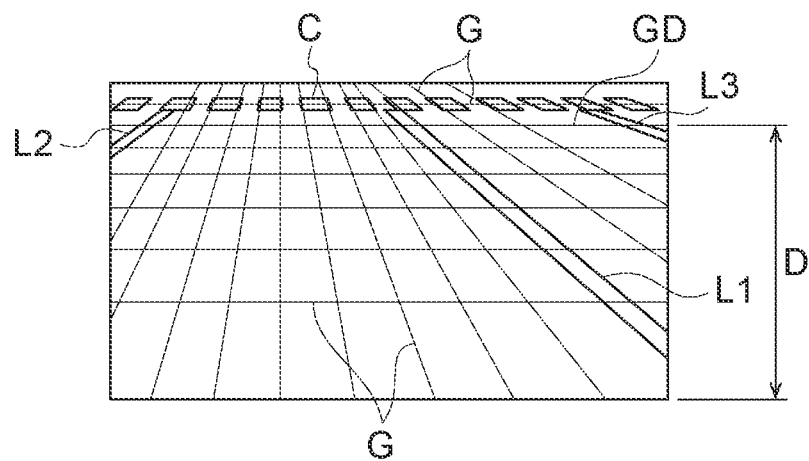
FIG. 6B is a diagram showing a captured image that shows a limit on the interpolation candidates imposed by the distance from the stereo camera.

The interpolation candidate recognition unit 13 need not necessarily use the grid map in recognizing interpolation candidates. FIG. 6B is a diagram showing a captured image that shows the limit on the interpolation candidates imposed by the distance from the stereo camera 3. As shown in FIG. 6B, the interpolation candidate recognition unit 13 may recognize the image areas, the distance of which from the stereo camera 3 (vehicle M) is equal to or smaller than the fourth threshold D (image areas below the horizontal line GD) in the captured image, as interpolation candidates. In this manner, the interpolation candidate recognition unit 13 may limit the interpolation candidates to the image areas the distance of which from the stereo camera 3 (vehicle M) is equal to or smaller than the fourth threshold D. This avoids incorrect traveling road surface interpolation in a distant image area where the capturing accuracy of the stereo camera 3 is low.

Figure 7:
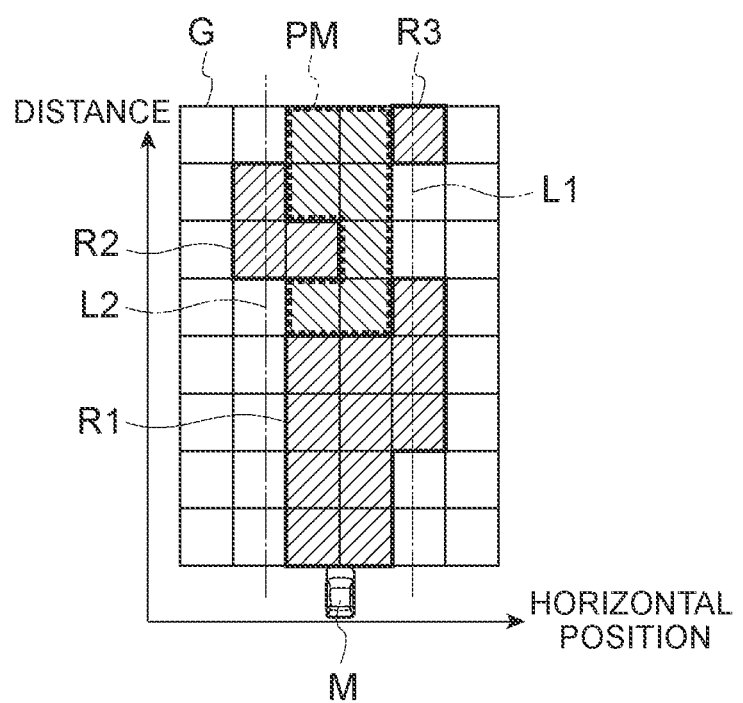
FIG. 7 is a grip map showing a limit on the interpolation candidates imposed by the lane boundaries of a traveling lane.

FIG. 7 is a grid map showing a limit on the interpolation candidates imposed by the lane boundaries of a traveling lane. Dashed lines L1 and L2 shown in FIG. 7 denote white lines L1 and L2 that are the lane boundaries of the traveling lane of the vehicle M. The white lines L1 and L2 shown in FIG. 7 are exemplary and are not the same as the white lines L1 and L2 shown in FIG. 3A.

As shown in FIG. 7, the interpolation candidate recognition unit 13 may recognize an image area as an interpolation candidate when the image area is not determined by the traveling road surface determination unit 12 as the traveling road surface and is on the side nearer to the traveling lane (vehicle M side) than the white lines L1 and L2 that are the lane boundaries of the traveling lane in which the vehicle M travels. That is, the interpolation candidate recognition unit 13 does not recognize the image areas outside the white lines L1 and L2 as interpolation candidates. The lane boundaries are detected by the image acquisition unit 10 from the captured image. For example, the image acquisition unit 10 detects (recognizes) the white lines L1 and L2 using a method based on the brightness information on the captured image.

If only one of the white lines L1 and L2 is detected by the image acquisition unit 10, the interpolation candidate recognition unit 13 recognizes an image area as an interpolation candidates when the image area is not determined as the traveling road surface and is on the side nearer to the traveling lane (vehicle M side) than the recognized white line. The lane boundary is not limited to a white line but may be a guardrail or a level difference on the road shoulder. The interpolation candidate recognition unit 13 need not necessarily use the grid map; instead, the interpolation candidate recognition unit 13 may recognize the image areas that are defined in a different manner, and are on the side nearer to the traveling lane than the lane boundaries (for example, L1, L2) in the captured image, as interpolation candidates. In this manner, the interpolation candidate recognition unit 13 may limit the interpolation candidates to the image areas that are on the side nearer to the traveling lane than the lane boundaries. This avoids incorrect traveling road surface interpolation in the image areas outside the lane boundaries that might not be necessary depending upon the control content.

Figure 8A:
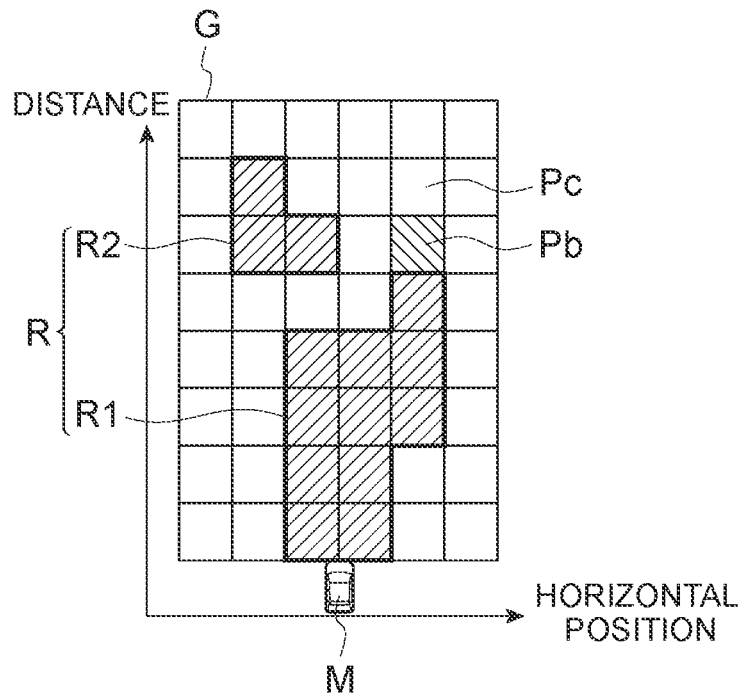
FIG. 8A is a grid map showing a limit on an interpolation candidate imposed on an image area depending upon whether the image area adjoins the traveling road surface.

FIG. 8A is a grid map showing a limit on an interpolation candidate imposed on an image area depending upon whether the image area adjoins the traveling road surface. FIG. 8A shows an image area Pb that adjoins the first road-surface-determined area R1 and an image area Pc that adjoins neither the first road-surface-determined area R1 nor the second road-surface-determined area R2.

As shown in FIG. 8A, the interpolation candidate recognition unit 13 may recognize the image area Pb, which is not determined by the traveling road surface determination unit 12 as the traveling road surface and adjoins an image area determined by the traveling road surface determination unit 12 as the traveling road surface, as an interpolation candidate. That is, the interpolation candidate recognition unit 13 need not recognize an image area, other than adjoining image areas that adjoin an image area determined by the traveling road surface determination unit 12 as the traveling road surface, as an interpolation candidate. The adjoining image areas mentioned here refer to image areas that adjoin each other with a grid line of the grid G between them. The adjoining image areas may or may not include image areas diagonally adjoining each other in the grid map. The image area Pb is an example of an interpolation candidate. The interpolation candidate recognition unit 13 recognizes all image areas that adjoin any of the first road-surface-determined area R1 and the second road-surface-determined area R2 and are positioned around the first road-surface-determined area R1 and the second road-surface-determined area R2 in the grid map, as interpolation candidates. In this case, too, the image area Pc shown in FIG. 8A, which adjoins neither the first road-surface-determined area R1 nor the second road-surface-determined area R2, is not recognized as an interpolation candidate.

In addition, the interpolation candidate recognition unit 13 may recognize an image area as an interpolation candidate when the image area is not determined by the traveling road surface determination unit 12 as the traveling road surface and adjoins an image area interpolated by the traveling road surface interpolation unit 14 as the traveling road surface. That is, the interpolation candidate recognition unit 13 need not recognize an image area, other than an image area that adjoins either an image area determined by the traveling road surface determination unit 12 as the traveling road surface or an image area interpolated by the traveling road surface interpolation unit 14 as the traveling road surface, as an interpolation candidate.

Figure 8B:
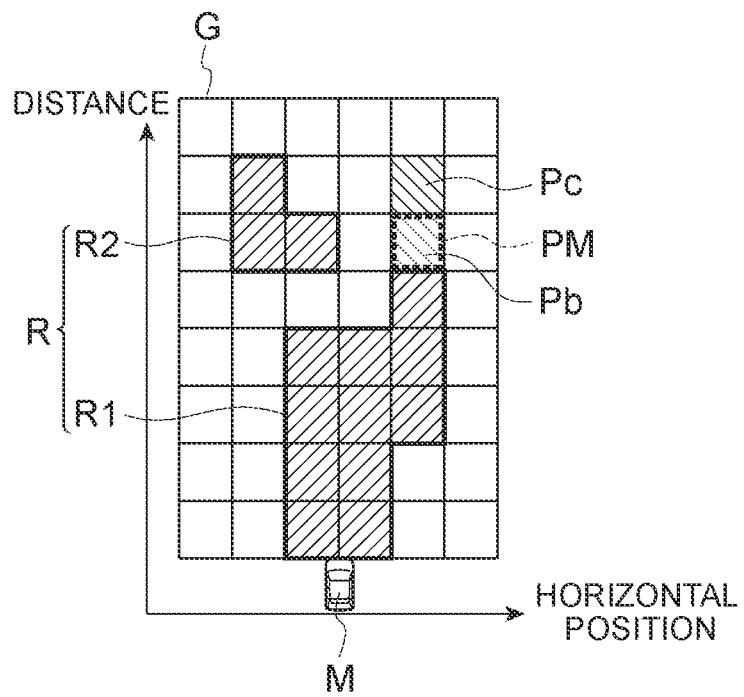
FIG. 8B is a grip map showing the state in which the number of interpolation candidates is increased by the interpolation of a new traveling road surface.

FIG. 8B is a grid map showing the state in which the number of interpolation candidates is increased by the interpolation of a new traveling road surface. In FIG. 8B, the interpolation candidate Pb is interpolated as the traveling road surface. In addition, an image area Pc, which adjoins the image area Pb that is interpolated as the traveling road surface, is recognized as a new interpolation candidate. That is, because the image area Pb of the interpolation candidate that adjoins the first road-surface-determined area R1 is interpolated as the traveling road surface, the interpolation candidate recognition unit 13 may recognize the image area Pc, which adjoins neither the first road-surface-determined area R1 nor the second road-surface-determined area R2 and which adjoins the image area Pb, as a new interpolation candidate. The interpolation candidate recognition unit 13 need not necessarily use the grid map. The interpolation candidate recognition unit 13 may recognize an image area which is defined in a different manner and adjoins an image area such as that described above, as an interpolation candidate. In this manner, the interpolation candidate recognition unit 13 may limit the interpolation candidates to the image areas that adjoin an image area determined or interpolated as the traveling road surface. This avoids incorrect traveling road surface interpolation that might otherwise be performed on a flat surface, such as a wall surface, that is not continuous with the traveling road surface.

Although variations of an interpolation candidate have been described, an interpolation candidate is not limited to those described above. The interpolation candidate recognition unit 13 may recognize an interpolation candidate by combining any two of the following limits: the limit imposed by the distance from the stereo camera 3 shown in FIG. 6A and FIG. 6B, the limit imposed by the lane boundaries shown in FIG. 7, and the limit on an image area that adjoins the traveling road surface shown in FIG. 8A and FIG. 8B. The interpolation candidate recognition unit 13 may also recognize an interpolation candidate by combining all of them.

There are some additional cases in which the interpolation candidate recognition unit 13 recognizes an image area as an interpolation candidate. In one case, the interpolation candidate recognition unit 13 may recognize an image area as an interpolation candidate when the image area is not determined by the traveling road surface determination unit 12 as the traveling road surface and is positioned at a distance equal to or smaller than the distance to the road-surface-determined area R (for example, the road-surface-determined area R3 in FIG. 5A) that is most distant from the stereo camera 3.

That is, the interpolation candidate recognition unit 13 need not recognize an image area that is more distant than the road-surface-determined area R, which is most distant from the stereo camera 3, as an interpolation candidate.

In another case, the interpolation candidate recognition unit 13 may recognize an image area as an interpolation candidate when the image area is not determined by the traveling road surface determination unit 12 as the traveling road surface and is positioned between the road-surface-determined areas R in the distance direction or the horizontal position direction in the grid map. That is, the interpolation candidate recognition unit 13 need not recognize the image areas that are not positioned between the road-surface-determined areas R in the distance direction or the horizontal position direction as interpolation candidates. When recognizing interpolation candidates in the captured image, the interpolation candidate recognition unit 13 need not recognize the image areas that are not positioned between the road-surface-determined areas R in the vertical direction or the horizontal direction in the captured image as interpolation candidates. The interpolation candidate recognition unit 13 may also combine these additional cases with the limits described above (the limit imposed by the distance from the stereo camera 3 shown in FIG. 6A and FIG. 6B, the limit imposed by the lane boundaries shown in FIG. 7, and the limit on an image area that adjoins the traveling road surface shown in FIG. 8A and FIG. 8B) to recognize an interpolation candidate.

Next, a traveling road surface detection method used by the traveling road surface detection device 1 is described below with reference to the drawings. FIG. 9 is a flowchart showing the traveling road surface detection method used by the traveling road surface detection device 1. For example, the flowchart shown in FIG. 9 is executed at each pre-set time interval while the engine of the vehicle M is in operation.

As shown in FIG. 9, the ECU 2 of the traveling road surface detection device 1 causes the image acquisition unit 10 to acquire an image in step S101. The image acquisition unit 10 acquires the image information around the vehicle captured by the stereo camera 3. Based on the acquired image information, the image acquisition unit 10 may perform the lane-boundary recognition process, in which the lane boundaries of the traveling lane of the vehicle M are recognized, using image processing such as edge detection.

Next, in step S102, the ECU 2 causes the three-dimensional position restoration unit 11 to restore the three-dimensional position information. Based on the disparity information (disparity information on disparity image) obtained from the captured image, the three-dimensional position restoration unit 11 restores (calculates) the three-dimensional position information corresponding to the pixels of the captured image. In addition, in step S102, the three-dimensional position restoration unit 11 divides the captured image using the grid G into a plurality of image areas.

Next, in step S103, the ECU 2 causes the traveling road surface determination unit 12 to determine whether each image area is the traveling road surface (traveling road surface determination step). The traveling road surface determination unit 12 determines whether each image area is the traveling road surface, based on the disparity information on the captured image. The traveling road surface determination unit 12 determines whether each image area is the traveling road surface from the disparity information.

In step S104, the ECU 2 causes the interpolation candidate recognition unit 13 to recognize an interpolation candidate (interpolation candidate recognition step). For example, the traveling road surface determination unit 12 recognizes the image areas that are not determined by the traveling road surface determination unit 12 as the traveling road surface, as interpolation candidates. The interpolation candidate recognition unit 13 may recognize an interpolation candidate by setting various limits described above.

In step S105, the ECU 2 determines whether the traveling road surface is to be interpolated by the traveling road surface interpolation unit 14 (traveling road surface interpolation step). The traveling road surface interpolation unit 14 determines whether an interpolation candidate is to be interpolated as the traveling road surface based on the brightness information on the captured image. The processing by the traveling road surface interpolation unit 14 to determine whether to interpolate the traveling road surface will be described later in detail.

In step S106, the ECU 2 causes the traveling road surface information output unit 15 to output the traveling road surface information. The traveling road surface information output unit 15 outputs the information on the road-surface-determined areas R and the interpolation area PM to the outside devices as the detected traveling road surface. For example, the traveling road surface information output unit 15 outputs traveling road surface information to the ECU that performs the autonomous driving of the vehicle M or to the ECU that performs the driving support of the vehicle M.

Figure 10:
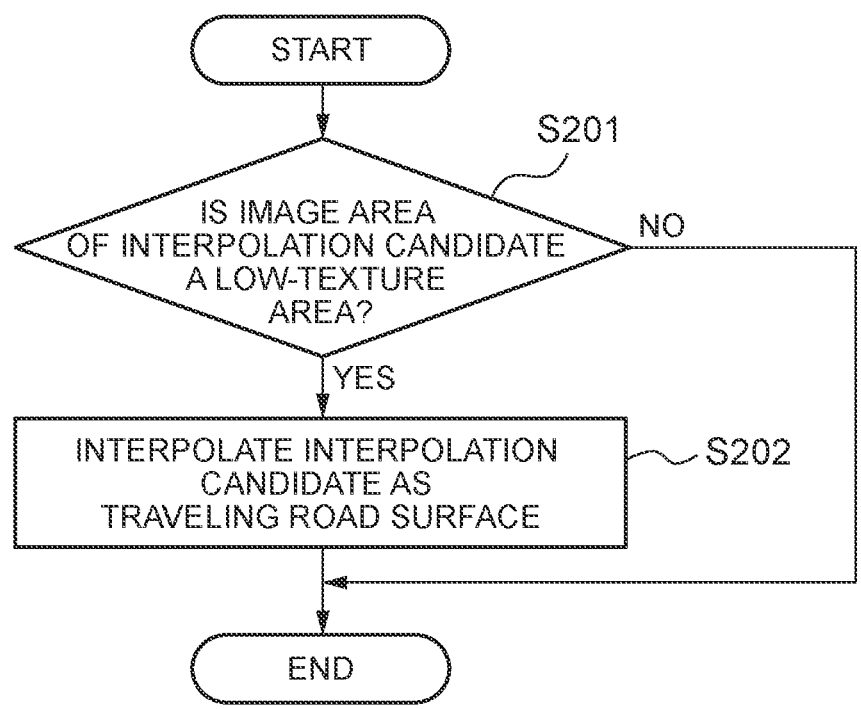
FIG. 10 is a flowchart showing an interpolation method of the traveling road surface used by the traveling road surface detection device.

FIG. 10 is a flowchart showing an interpolation method of the traveling road surface used by the traveling road surface detection device 1. The flowchart shown in FIG. 10 corresponds to the processing of S105 of the flowchart shown in FIG. 9. The flowchart shown in FIG. 10 is executed, for example, at each interpolation candidate.

As shown in FIG. 10, the ECU 2 of the traveling road surface detection device 1 causes the traveling road surface interpolation unit 14 to determine in step S201 whether the interpolation candidate is a low-texture area. The traveling road surface interpolation unit 14 determines whether the interpolation candidate is a low-texture area based on the brightness information on the captured image. The traveling road surface interpolation unit 14 determines that the interpolation candidate is a low-texture area when the interpolation candidate satisfies one of the two conditions: (a) the number of pixel ranges that adjoin each other and the brightness difference between which is equal to or smaller than the first threshold, is equal to or larger than the second threshold and (b) the ratio of pixel ranges that adjoin each other and the brightness difference between which is equal to or smaller than the first threshold, is equal to or larger than the third threshold. The traveling road surface interpolation unit 14 determines that the interpolation candidate is not a low-texture area when the interpolation candidate satisfies none of the two conditions: (a) the number of pixel ranges that adjoin each other and the brightness difference between which is equal to or smaller than the first threshold, is equal to or larger than the second threshold and (b) the ratio of pixel ranges that adjoin each other and the brightness difference between which is equal to or smaller than the first threshold, is equal to or larger than a third threshold.

When it is determined by the traveling road surface interpolation unit 14 that the interpolation candidate is not a low-texture area (S201: NO), the ECU 2 terminates the processing without interpolating the interpolation candidate as the traveling road surface. Conversely, when it is determined by the traveling road surface interpolation unit 14 that the interpolation candidate is a low-texture area (S201: YES) the processing proceeds to step S202. In step S202, the ECU 2 causes the traveling road surface interpolation unit 14 to interpolate the interpolation candidate, which was determined as a low-texture area, as the traveling road surface.

According to the traveling road surface detection device 1 described above, the disparity information can be obtained accurately for an image area in which the brightness change is large in the captured image and, in this case, the traveling road surface can be detected based on the disparity information. On the other hand, for an image area in which the brightness change is small in the captured image (low-texture area), the image area may be determined as an interpolation candidate for the traveling road surface based on the brightness information. Therefore, the traveling road surface detection device 1, which performs traveling road surface interpolation based on the brightness information, can increase the detection range of the traveling road surface as compared to the case in which the traveling road surface is detected only based on the disparity information.

In the traveling road surface detection device 1, the traveling road surface interpolation unit 14 may determine an image area as an interpolation candidate when the image area is not determined by the traveling road surface determination unit as the traveling road surface and the distance from the stereo camera 3 is equal to or smaller than the fourth threshold. Because the accuracy of the disparity information becomes lower as an image area is more distant from the in-vehicle camera, the traveling road surface detection device 1 determines an image area, the distance of which from the stereo camera 3 is equal to or smaller than the fourth threshold, as an interpolation candidate. This avoids incorrect traveling road surface interpolation that might occur when the interpolation candidate is an indefinitely distant image area.

In the traveling road surface detection device 1, the image acquisition unit 10 may detect the lane boundaries of the traveling lane, in which the vehicle M travels, based on the captured image. In addition, the traveling road surface interpolation unit 14 may determine an image area as an interpolation candidate when the image area is not determined by the traveling road surface determination unit 12 as the traveling road surface and is on the side nearer to the traveling lane than the lane boundaries (for example, white line L1, L2) detected by the image acquisition unit 10. Because, in some cases, there is no need for detecting the traveling road surface outside the traveling lane in which the vehicle travels, the traveling road surface detection device 1 may determine an image area, which is on the side nearer to the traveling lane than the lane boundaries such as a white line, as an interpolation candidate. This prevents a part, such as a level difference on the road shoulder outside the traveling lane, from being interpolated incorrectly as the traveling road surface.

In the traveling road surface detection device 1, the traveling road surface interpolation unit 14 may determine an image area as an interpolation candidate when the image area is not determined by the traveling road surface determination unit 12 as the traveling road surface and when the image area adjoins either an image area determined by the traveling road surface determination unit 12 as the traveling road surface or an image area interpolated by the traveling road surface interpolation unit 14 as the traveling road surface. Because the traveling road surface is continuous, the traveling road surface detection device 1 determines an image area that adjoins a road-surface-determined area R or an interpolation area PM as an interpolation candidate. This prevents an object (such as a wall face), separate from the traveling road surface, from being incorrectly interpolated as the traveling road surface, for example, as an isolated traveling road surface.

While exemplary embodiments have been described, it will be understood that the inventive concept is not limited to the exemplary embodiments above. The inventive concept may be implemented not only by the exemplary embodiments described above but also by various modes in which various changes and modifications are added based on the knowledge of those skilled in the art.

What is claimed is:

1. A traveling road surface detection device, comprising:
a traveling road surface determination unit configured to determine whether each of a plurality of image areas into which a captured image is divided is on a traveling road surface based on disparity information obtained from the captured image; and
a traveling road surface interpolation unit configured to interpolate a first image area into a detected traveling road surface based on brightness information of the captured image, the first image area being included in interpolation candidates among image areas determined as not being a part of the traveling road surface by the traveling road surface determination unit,
wherein each of the plurality of image areas is comprises a plurality of pixel ranges, and
wherein the first image area is at least one from among: an image area in which a number of first pixel ranges adjacent to a pixel range with a brightness difference that is less than or equal to a first threshold, is equal to or larger than a second threshold, and an image area in which a ratio of the first pixel ranges is equal to or larger than a third threshold.

2. The traveling road surface detection device according to claim 1, wherein
the traveling road surface interpolation unit uses a second image area that is among the image areas determined as not being the part of the traveling road surface by the traveling road surface determination unit and that is within a distance equal to or smaller than a fourth threshold from an in-vehicle camera, as the interpolation candidate.

3. The traveling road surface detection device according to claim 1, further comprising:
a lane boundary detection unit configured to detect lane boundaries of a traveling lane in which a vehicle travels, based on the captured image,
wherein the traveling road surface interpolation unit uses a third image area that is among the image areas determined as not the traveling road surface by the traveling road surface determination unit and is nearer to the traveling lane than the lane boundaries, as the interpolation candidate.

4. The traveling road surface detection device according to claim 1, wherein
the traveling road surface interpolation unit uses a fourth image area that is among the image areas determined as not being the part of the traveling road surface by the traveling road surface determination unit and that is adjacent to either an image area determined as the traveling road surface by the traveling road surface determination unit or the first image area, as the interpolation candidate.

5. A traveling road surface detection method, the method comprising:
a traveling road surface determination step in which a traveling road surface determination unit of the traveling road surface detection device determines whether each of a plurality of image areas into which a captured image is divided is on a traveling road surface based on disparity information obtained from the captured image; and
a traveling road surface interpolation step in which a traveling road surface interpolation unit of the traveling road surface detection device interpolates a first image area into a detected traveling road surface based on brightness information of the captured image, the first image area being included in interpolation candidates among image areas determined as not being a part of the traveling road surface by the traveling road surface determination unit,
wherein each of the plurality of image areas is comprises a plurality of pixel ranges, and
wherein the first image area is at least one from among: an image area in which a number of first pixel ranges adjacent to a pixel range with a brightness difference that is less than or equal to a first threshold, is equal to or larger than a second threshold, and an image area in which a ratio of the first pixel ranges is equal to or larger than a third threshold.

6. The traveling road surface detection method according to claim 5, wherein
the traveling road surface interpolation unit uses a second image area that is among the image areas determined as not the traveling road surface by the traveling road surface determination unit and is within a distance equal to or smaller than a fourth threshold from an in-vehicle camera, as the interpolation candidate.

7. The traveling road surface detection method according to claim 5, further comprising:
a lane boundary detection step in which a lane boundary detection unit that detects lane boundaries of a traveling lane in which a vehicle travels, based on the captured image,
wherein the traveling road surface interpolation unit uses a third image area that is among the image areas determined as not the traveling road surface by the traveling road surface determination unit and is nearer to the traveling lane than the lane boundaries, as the interpolation candidate.

8. The traveling road surface detection method according to claim 5, wherein
the traveling road surface interpolation unit uses a fourth image area that is among the image areas determined as not the traveling road surface by the traveling road surface determination unit and is adjacent to either an image area determined as the traveling road surface by the traveling road surface determination unit or the first image area, as the interpolation candidate.

9. A traveling road surface detection device, comprising:
at least one memory comprising computer executable instructions;
at least one processor configured to read and execute the computer executable instructions to perform:
determining whether each of a plurality of image areas into which a captured image is divided is on a traveling road surface based on disparity information obtained from the captured image; and
interpolating a first image area into a detected traveling road surface based on brightness information of the captured image, the first image area being included in interpolation candidates among image areas determined as not being a part of the traveling road surface by the determining,
wherein each of the plurality of image areas comprises a plurality of pixel ranges, and
wherein the first image area is at least one from among: an image area in which a number of first pixel ranges adjacent to a pixel range with a brightness difference that is less than or equal to a first threshold, is equal to or larger than a second threshold, and an image area in which a ratio of the first pixel ranges is equal to or larger than a third threshold.

10. The traveling road surface detection device according to claim 9, wherein the interpolating uses a second image area that is among the image areas determined as not being the part of the traveling road surface by the determining and that is within a distance equal to or smaller than a fourth threshold from an in-vehicle camera, as the interpolation candidate.

11. The traveling road surface detection device according to claim 9, wherein the at least one processor is further configured to perform:

detecting lane boundaries of a traveling lane in which a vehicle travels, based on the captured image, wherein the interpolating uses a third image area that is among the image areas determined as not the traveling road surface by the determining and is nearer to the traveling lane than the lane boundaries, as the interpolation candidate.

12. The traveling road surface detection device according to claim 9, wherein the interpolating uses a fourth image area that is among the image areas determined as not being the part of the traveling road surface by the determining and that is adjacent to either an image area determined as the traveling road surface by the determining or the first image area, as the interpolation candidate.

\* \* \* \* \*